UNITED STATES PATENT OFFICE.

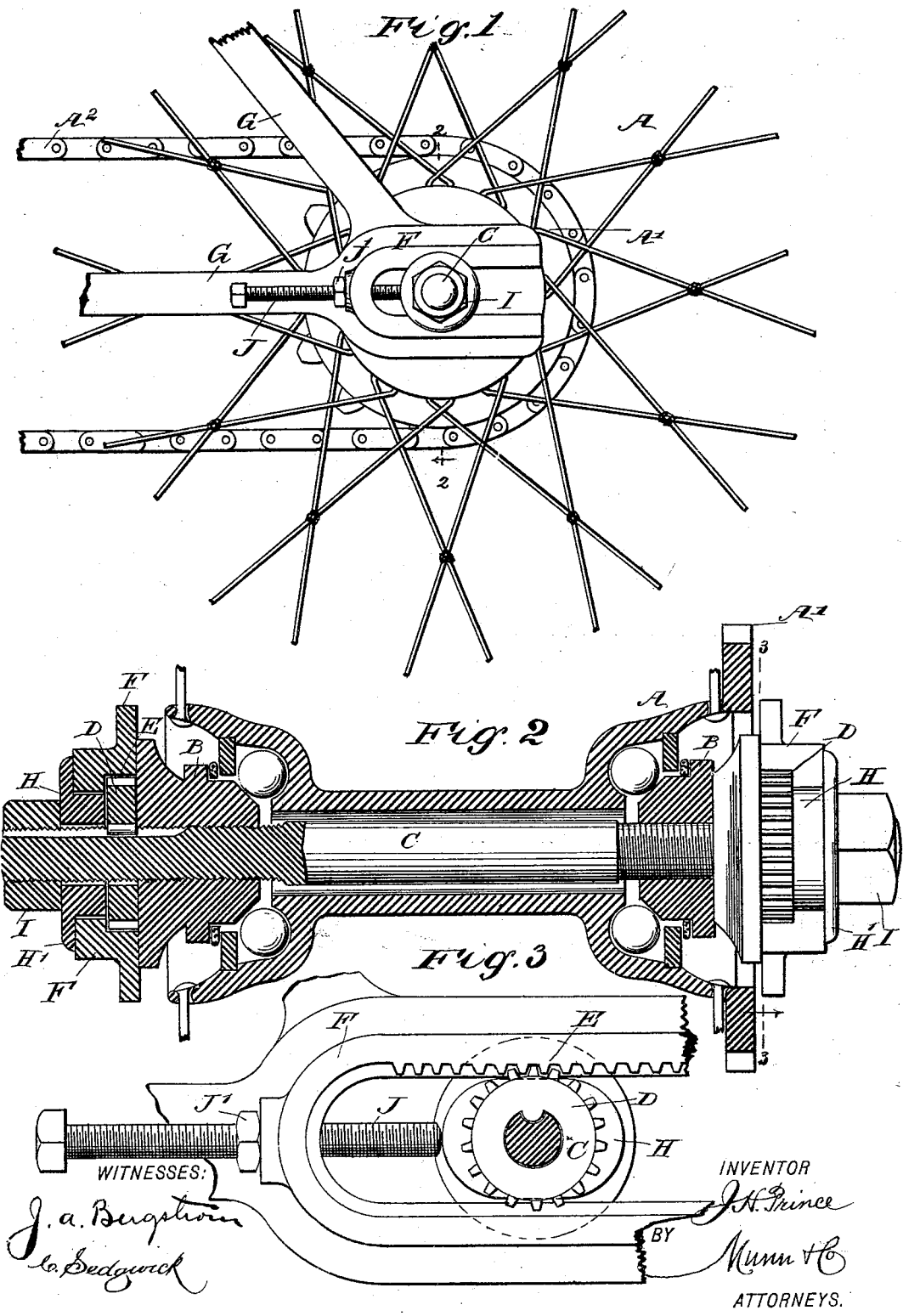

JOHN HOWARD PRINCE, OF CARROLL, MONTANA.

ADJUSTING DEVICE FOR BICYCLES.

SPECIFICATION forming part of Letters Patent No. 517,294, dated March 27, 1894.

Application filed November 23, 1893. Serial No. 491,766. (No model.)

*To all whom it may concern:*

Be it known that I, JOHN HOWARD PRINCE, of Carroll, in the county of Deer Lodge and State of Montana, have invented a new and Improved Adjusting Device for Bicycles, of which the following is a full, clear, and exact description.

The object of the invention is to provide a new and improved adjusting device, for use on bicycles to conveniently and readily tighten the driving chain, and to hold the spindle of the driven wheel always in parallel position, relative to the pedal or crank shaft, so as to cause the wheel to run true.

The invention consists of certain parts and details and combinations of the same, as will be fully described hereinafter, and then pointed out in the claims.

Reference is to be had to the accompanying drawings, forming a part of this specification, in which similar letters of reference indicate corresponding parts in all the figures.

Figure 1 is a side elevation of the improvement. Fig. 2 is an enlarged transverse section of the same on the line 2—2 of Fig. 1; and Fig. 3 is a sectional side elevation of the same on the line 3—3 of Fig. 2.

The wheel A, is driven from the pedal or crank shaft and is provided for this purpose on its hub, with the usual sprocket wheel A', connected by the sprocket chain A², with a sprocket wheel on the crank or pedal shaft. The hub of the wheel A, is journaled in the usual manner by ball bearings on the cones B, secured on the spindle C, extending centrally through the hub of the wheel A, as is plainly illustrated in Fig. 2.

On the spindle C next to the outer ends of the cones B, are secured the gear wheels D, meshing in racks E, secured or formed in the forked ends F, of the bicycle frame G. The gear wheels D, are preferably connected with the spindle C, by keys engaging key-ways in the spindle, as is plainly illustrated in Figs. 2 and 3, but other suitable devices may be employed. The outer ends of the spindles C, also engage bushings H, fitted to slide in the forked ends F of the frame G, the said forked ends being made sufficiently wide, so that each accommodates the rack and bearing surface for the corresponding bushing H. As shown in Fig. 2, the diameter of each gear wheel D, is preferably somewhat larger than the bushing H, so that shoulders are formed on the inner faces of the fork to securely hold the gear wheel in place, to prevent lateral displacement. Each bushing H is provided on its outside with a flange H', adapted to abut on the outer faces of the corresponding forked end F, and on the flanges abut the nuts I, screwing on the extreme outer ends of the spindle C, so as to hold the latter in place.

In order to limit the inward sliding motion of the spindle C or to adjust the latter and the parts connected therewith, I prefer a screw J, screwing in the middle part of the forked end F, to engage with its inner end and the corresponding bushing H, as is plainly shown in Fig. 3. The screw J is locked in place by a suitable jam nut J' or other devices. Now, it will be seen, that when the screw J is unlocked and screwed up, then the inner end of the said screw moves the bushing H rearward, and as the bushing is held on one end of the spindle C, the latter is moved rearward, whereby the gear wheel D rolls off on its rack E, and as the said gear wheel is fixed to the spindle C the latter will revolve, so that the gear wheel on the other side of the spindle likewise rolls off on its rack the same distance, whereby the spindle C is moved uniformly at both ends, and consequently the spindle will remain parallel to the crank or pedal shaft of the bicycle. By adjusting the screw J in the manner described, any slack existing in the driving chain A² is readily taken up. When it is desired to move the spindle C forward the screw J is unscrewed and the wheel A pushed forward so as to keep the bushing H in abutment with the said screw J. When the spindle C is in the desired position the screw J is locked in place by screwing up the jam nut J'. It is understood that the gear wheels D are free to slide laterally on the keyways of the spindle C to allow the fork to be drawn up against the cone of the ball bearing after any adjustment of the same by means of the nut I on the spindle.

Instead of the screw J other suitable means may be employed to limit the sliding motion of the screw and to adjust the latter.

Having thus fully described my invention, I claim as new and desire to secure by Letters Patent—

1. An adjusting device for bicycles, comprising a frame provided in its forked ends with racks, gear wheels in mesh with the said racks and secured on a spindle, and bushings on which the spindle is mounted to turn, the said bushings being fitted to slide in the forked ends of the frame, a screw screwing in the frame and adapted to engage one of the said bushings, and nuts screwing on the ends of the spindle and abutting on flanges formed on the said bushings, substantially as shown and described.

2. In an adjusting device for bicycles, the combination of the frame having its forked ends formed with offsets and racks in said offsets, a spindle, pinions on the spindle and meshing with the racks, bushings sliding in the forked ends and provided with flanges abutting against the outer surfaces of the said forked ends, a screw screwing into the frame and engaging one of the said bushings, and nuts on the spindle and engaging the bushings, substantially as described.

JOHN HOWARD PRINCE.

Witnesses:
W. F. DORAN,
CHARLES HOUCK.